United States Patent [19]

Marsh

[11] 3,986,728
[45] Oct. 19, 1976

[54] PIPE COUPLING
[75] Inventor: Gerald A. Marsh, Houston, Tex.
[73] Assignee: HydroTech International, Inc., Houston, Tex.
[22] Filed: Oct. 8, 1974
[21] Appl. No.: 513,057

[52] U.S. Cl. .............................. 285/18; 285/96; 285/322
[51] Int. Cl.² ................................ F16L 35/00
[58] Field of Search .............. 285/18, 93, 356, 141, 285/308, 321, DIG. 21, 96, 322

[56] References Cited
UNITED STATES PATENTS

| 3,393,926 | 7/1968 | Arnold | 285/18 |
| 3,704,033 | 11/1972 | Arnold | 285/18 |
| 3,830,526 | 8/1974 | Mohr | 285/18 |

Primary Examiner—Andrew V. Kundrat

[57] ABSTRACT

A hydraulically actuated coupling for effecting a connection to a pipe member or the like which has axially spaced apart pluralities of oppositely biased gripping slips which are continuously urged into gripping engagement between the housing and the pipe. This arrangement permits the pipe coupling to withstand both tension and compression forces thereon and to continuously maintain slips in positive engagement with the pipe. The coupling also has separate seal means which are separately operated by a thrust member which applies axial force to thereby radially deform elastomeric seal members into sealing engagement between the pipe and the housing. The separate actuation means for the slips and for the seal means provides a more fail-safe coupling and one which can be adapted to various pipe sizes and pressure requirements.

11 Claims, 5 Drawing Figures

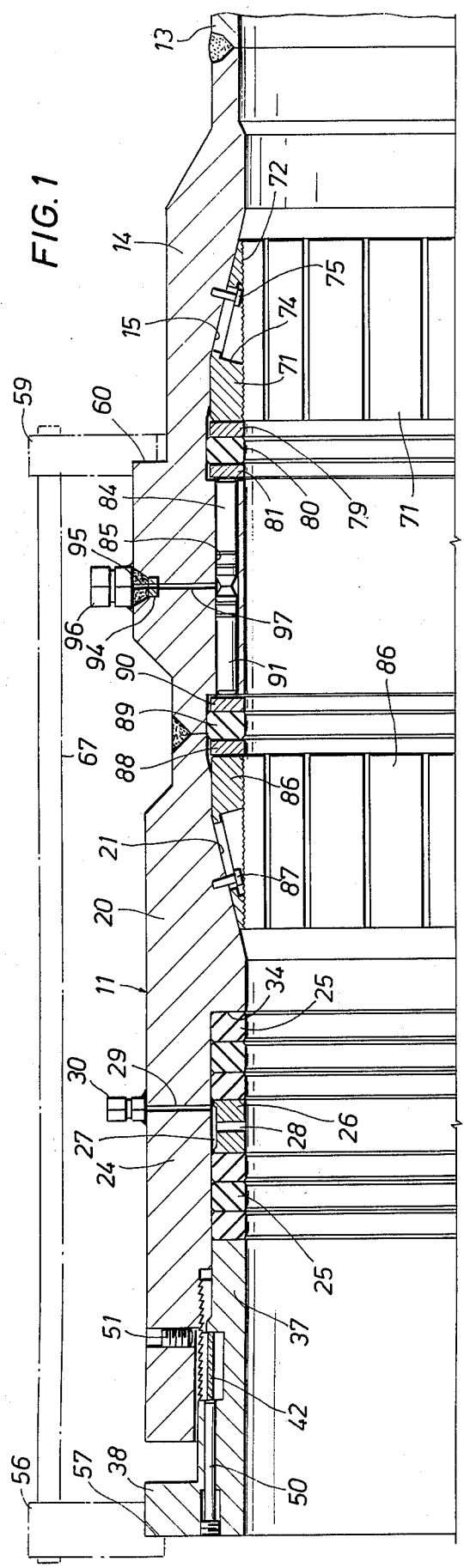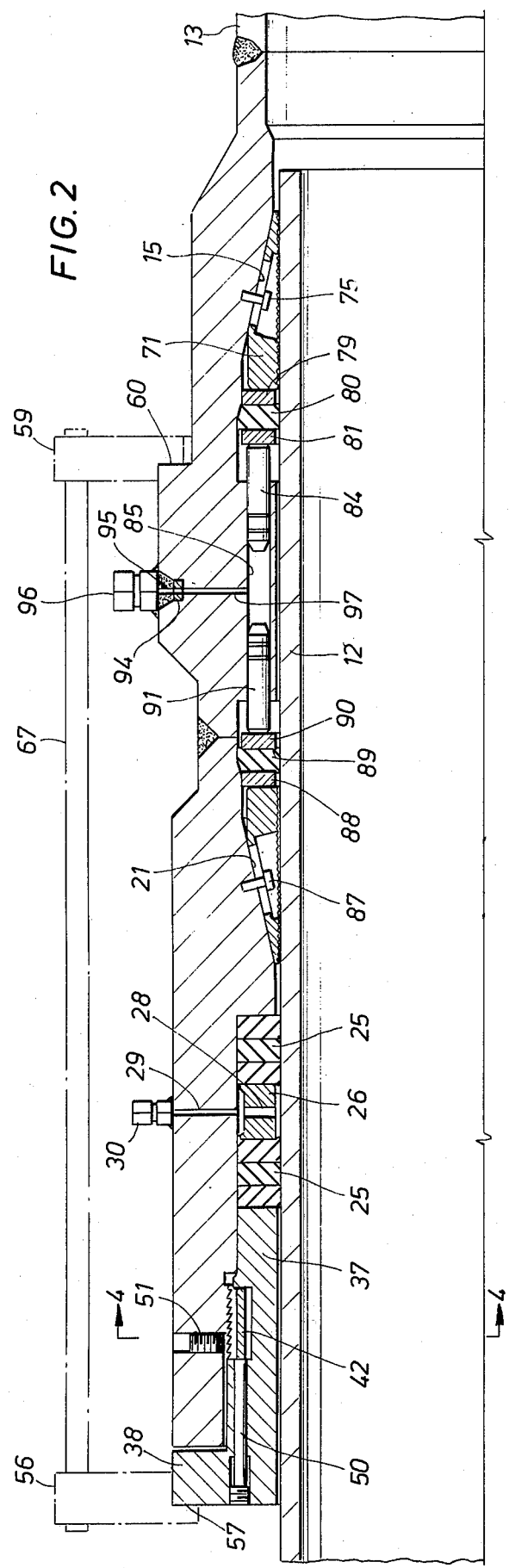

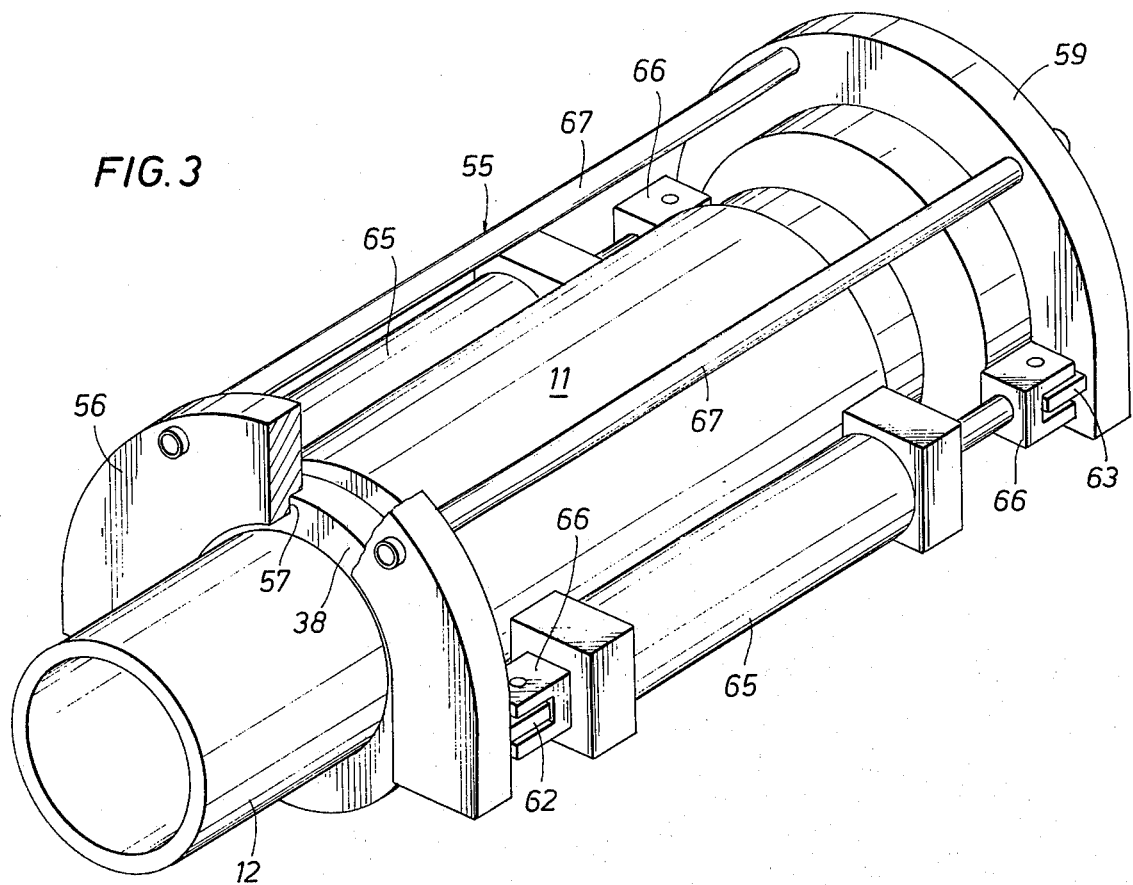
FIG. 3
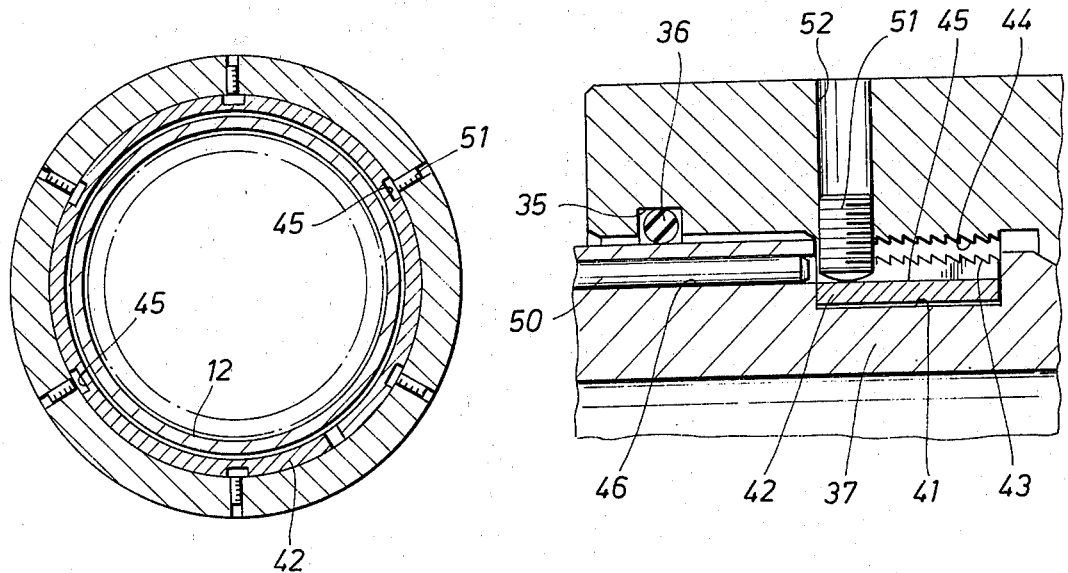
FIG. 5
FIG. 4

3,986,728

PIPE COUPLING

BACKGROUND OF THE INVENTION

1. Field of the Invention

This invention relates to a pipe coupling apparatus which is useful for making connection to a pipe or which, when used in pairs, can be used to join two pieces of pipe or the like. More particularly, this invention relates to a pipe coupling apparatus which is particularly useful for making underwater pipe connections and which can be operated remotely by the use of hydraulic fluids.

2. Description of the Prior Art

Most prior art pipe coupling devices either had hydraulically actuated seal means for effecting a seal between a coupling and a pipe without any gripping means or had gripping means for effecting locking of the coupling with the pipe without any seal means. Subsequent to that, there developed a type of pipe coupling which was hydraulically actuated which combined both seal means and gripping means which were hydraulically actuated, but which actuation was by the same system. The following U.S. patents are generally illustrative of this type of apparatus, and they include U.S. Pat. Nos. 3,393,926, 3,704,033 and 3,830,526. Couplings of the type taught in these patents have been very useful in certain installations and have been considered superior to certain prior art couplings. However, they are not suitable in all installations and all working conditions, and there developed a need for an improved underwater hydraulically actuated pipe coupling in which the seal means could be separately actuated from the gripping means and wherein the two could be separately actuated and operated to accommodate variations in size, pipeline pressures and external environmental conditions.

SUMMARY OF THE INVENTION

It is, therefore, an object of this invention to provide an improved pipe coupling device which is particularly adaptable for use underwater and which overcomes certain of the prior art problems discussed above.

By way of summary, this invention is for a pipe coupling having a housing arranged for mounting over the external surface of a pipe to which connection is to be made. The housing has deformable resilient annular seals mounted in the housing for sealing between the housing and the pipe upon actuation thereof. Thrust means in the form of a thrust sleeve or the like are included for applying axial force to the seal means to thereby deform the seal means to the sealing position. Actuation means are operably connected between the thrust means and the housing for urging the thrust means axially whereby the thrust means deforms the seal means to the sealing position. The apparatus also includes means operably associated with the housing and the thrust means for retaining the seal means in the actuated or sealing position.

The invention further includes within the housing a pair of spaced apart tapered and axially facing annular bowl surfaces on the internal surface thereof with the bowl surfaces being axially spaced apart from the aforesaid seal means. A plurality of circumferentially spaced apart wedge shaped gripping slips are supported in the housing in camming relationship with each of the bowl surfaces and arranged for gripping contact with the bowl and camming axially along the adjacent bowl surface. Annular spring means are mounted adjacent the blunt ends of the slips in each of the plurality of slips for applying a biasing force to the slips to thereby urge and cam the slips to the gripping position and to continuously urge said slips into gripping contact with the pipe. Means are included for applying hydraulically actuated force to the spring means to thereby axially compress the spring means and to thereby urge the slips to the gripping position.

The actuation means for actuating the thrust means includes a plurality of hydraulic cylinder and piston assemblies detachably connected to the housing and thrust means whereby the same may be removed after installation of the pipe coupling and reused. One form of thrust means is an annular sleeve having one axial end arranged to abutt against the end of the seal means to effect deformation thereof. The retaining means preferably takes the form of wedging or locking means carried by the sleeve and arranged for engaging the internal surface of the housing upon actuation to thereby lock the sleeve in the fixed position and, hence, lock the seals in a sealing position.

Preferably, the spring means are in the form of a rubber or other elastomeric ring which can store energy when subjected to axial compression. The means for applying hydraulic actuated forces to the spring means preferably includes the plurality of circumferentially spaced apart cylinders provided in the housing with each of the cylinders having two pistons mounted for axial movement therein and means for applying pressurized fluid to the cylinders to urge the pistons axially apart to effect or apply an axial force to the spring means discussed above.

Reference to the drawings will further explain the invention wherein:

FIG. 1 is a partial longitudinal central sectional view of one preferred embodiment of the invention showing the various elements in the unactuated positions.

FIG. 2 is a view similar to FIG. 1 but showing the gripping and seal means actuated into engagement with the pipe to which connection is to be made.

FIG. 3 is a perspective view of the coupling shown in FIGS. 1 and 2 and showing the setting clamp for actuating the seal means.

FIG. 4 is a cross-sectional view taken generally along Line 4—4 of FIG. 2.

FIG. 5 is a fragmentary and enlarged view of the locking means for locking the seals in the sealed position.

DESCRIPTION OF THE PREFERRED EMBODIMENT

Referring now to the drawings, the numeral 11 generally designates the coupling housing and the numeral 12 generally designates the pipe to which a connection is to be made. The right end of housing 11 as shown in FIGS. 1 and 2, is generally shown as being attached by welding or the like to an attaching sub 13 which, in turn, may be connected to a conventional flange or a tilted flange which, in turn, may be connected to a similar coupling device arranged for connecting to an adjacent piece of pipe. Alternatively, sub 13 may be connected to other innerconnecting means such as a member of a ball and socket coupling or the like. In making an underwater connection between two axially spaced apart pipe ends, it would be contemplated that each of the pipes to be connected would have mounted thereon a coupling of the type shown in FIGS. 1 and 2, with the couplings then being innerconnected by attaching means connected by welding or the like to the respective attaching subs 13. Hence, the usual installation for innerconnecting two pipes would be by the use of two couplings of the type as shown in FIGS. 1 and 2. However, for purposes of this application only, one of the couplings will be explained and described herein.

Housing 11 includes a portion identified as compression bowl 14 which has an inner annular axially tapered compression bowl surface 15 which forms a camming surface for gripping means to be described hereinafter. Housing 11 also includes a portion identified as tension bowl 20 which has on the inner diameter thereof an annular axially tapered tension bowl surface 21 which may be described as generally facing compression bowl surface 15 and arranged for camming engagement with additional gripping means which will be described hereinafter. Housing 11 also includes another portion which may be described as sealing sub 24 which carries sealing means in the form of a plurality of rubber or other elastomeric packing rings 25 having interposed therebetween a metal test ring 26 having a channel 27 about the exterior thereof which communicates with a plurality of radially extending ports 28 extending therethrough. Communication to channel 27 and ports 28 is via conduits 29 formed in the body of sub 24, which connects with plug 30, as shown. The tool may be provided with one or more such conduits 29 and plugs 30 spaced circumferentially about the housing 11, whereby fluids may be injected thereinto from a plurality of locations and through which evacuation of fluids from the setting system may be effected when that is desired.

The right furthermost packing ring 25, as shown in FIGS. 1 and 2, is arranged to abut against annular shoulder 34 which is formed by an annular radially inwardly extending portion of sub 24 as shown in FIGS. 1 and 2. The leftmost one of the packing rings 25, as shown in FIGS. 1 and 2, is arranged for axial abutment thereagainst by cylindrical locking sleeve 37. The opposite end of sleeve 37 has attached thereto an annularly enlarged portion forming packing flange 38. Hence, upon axial movement of sleeve 37 to the right, as shown in FIGS. 1 and 2, relative to housing 11, packing rings 25 are axially compressed and radially deformed into sealing engagement with pipe 12 as shown in FIG. 2. Once set in the position shown in FIG. 2, the sealing effect of packing rings 25 can be tested by applying fluid pressure through injector plug 30, conduit 29, channel 27 and ports 28.

In the event of failure of packing rings 25 to hold the desired pressure, the arrangement of the tool is such that the seals 25 could be deactuated and repaired or replaced, as will be described hereinafter. If it is determined that the packing and sealing is satisfactory, the testing fluid, such as hydraulic fluid, could be substituted with a hard-setting fluid, such as epoxy resin, to provide additional re-enforcing means for the packing rings 25 to insure continued sealing thereof.

As perhaps best seen in FIG. 5, the locking means for locking the seal means in the sealed position will now be described. Sleeve 37 is provided with an annular outwardly facing U-shaped channel 41 in which is mounted an annular split-ring 42. The external surface of ring 42 is provided with a plurality of gripping teeth 43 which are arranged for engagement with matching gripping teeth 44 formed on the internal surface of housing 11 at a position generally adjacent to teeth 43 when actuated. Split-ring 42 also has a plurality of longitudinally extending recesses 45 circumferentially spaced thereabout which are spaced and arranged for axial alignment with a plurality of axially extending bores 46 formed in sleeve 37. Each of the bores 46 is arranged to receive in threaded engagement therewith a ring retainer pin 50, the forward end of which is arranged to be received in one of the recesses 45.

Thus assembled, split-ring 42 is held in the retracted position. It is to be understood that split-ring 42 is generally oversized with respect to recess 41, wuch that upon release thereof, it will spring radially outwardly whereby gripping teeth 43 will grip mating teeth 44 as described above. Hence, in assembling the tool, split-ring 42 is mounted in recess 41 and held in the radially retracted position by insertion retainer pins 50 extending through recesses 45. Once sleeve 37 has been actuated to the right, as shown in FIGS. 2 and 5, to thereby set packing rings 25 as described above, pins 50 may be withdrawn which thus permits split-ring 42 to expand radially outward into engagement with teeth 44, thereby locking sleeve 37 in the actuated position and packing rings 25 in the sealed position. The axial outward end of housing 11 has an annular radially inwardly facing channel or recess 35 in which is received an O-ring 36 to effect sealing between the external surface of sleeve 37 and the end of housing 11.

In some instances, it may be desirable to deactuate the aforesaid setting means and seals, and this is accomplished by use of a plurality of set screws 51 which are provided in a plurality of radially extending threaded bores 52 circumferentially spaced about in matching alignment with pins 50 and recesses 45. By threading set screws 51 radially inwardly to the position shown in FIG. 5, split-ring 42 is thereby urged radially inwardly, thereby disengaging gripping teeth 43 and 44. At this point, alternate ones of set screws 51 may be withdrawn and the adjacent retainer pins 50 reinserted into the respective recesses 45, after which additional set screws 51 may be removed and additional pins 50 reinserted such that all set screws 51 have been removed radially outward and all pins 50 have been moved into the retaining position, whereby split-ring 42 is retained in the non-actuated position. At this point, sleeve 37 can be removed axially from the housing to permit changing or servicing of the packing rings 25, for example, with removing housing 11 from pipe 12.

Referring now to FIG. 3 in particular, the setting means for effecting setting of the aforesaid described seal means will now be described. These setting means generally take the form of removable setting clamp 55 which is formed at one end with a generally U-shaped compression member 56, which is arranged for mounting about flange 38 and supported thereby. It will be observed that member 56 has an annular shoulder 57 which is arranged to abut against the axial end of the flange 38 to thereby apply compression force thereto.

The opposite end of claim 55 includes another U-shaped compression member 59 which is similar to member 56 and arranged to similarly engage a shoulder 60 formed on the radially outward surface of housing 11, as shown in FIG. 1. Compression member 56 has two lugs 62 attached thereto and spaced at 180° from each other and member 59 has two similar lugs 63 attached thereto and similarly spaced. Compression means in the form of two hydraulic cylinder and piston assemblies 65 are attached between each lug 62 and lug 63, as shown in FIG. 5, by means of pins and attaching brackets 66 supported on each of the ends of assemblies 65. Hence, upon application of hydraulic fluid to assemblies 65 to the appropriate sides of the hydraulic pistons therein, a compression force is created which causes compression members 56 and 59 to be drawn together, which in turn causes locking sleeve 37 to be moved axially relative to housing 11, thereby compressing packing rings 25 to the position shown in FIG. 2. In order to assure appropriate parallel alignment of compression members 56 and 59, they are provided with circumferentially spaced guide holes in which are supported a pair of guide rods 67 which assure continued parallel alignment of members 56 and 59 during the actuation step discussed above.

When locking sleeve 37 has been actuated to the desired position and packing rings 25 have been sufficiently axially compressed and radially deformed, then retainer pins 50 may be removed, thereby permitting split ring 42 to expand radially outwardly whereby gripping teeth 43 engage mating gripping teeth 44, to thereby lock sleeve 37 in housing 11 as shown in FIG. 2. Thereafter, pressure can be relieved on hydraulic cylinder and piston assemblies 55, and setting clamp 55 removed for subsequent use on another coupling.

Referring now to FIGS. 1 and 2 in particular, the pipe gripping means of the coupling will be described in greater detail. Compression bowl surface 15 has supported adjacent thereto and spaced circumferentially thereabout in camming engagement therewith a plurality of wedge shaped pipe gripping slips 71, each of which is provided with gripping teeth 72 on the radially inward sides thereof for gripping engagement with pipe 12 upon actuation thereof. Each slip 71 is provided with a longitudinal slot 74 through which is mounted a cap screw 75 which is threaded into compression bowl 14 as shown. Each slot 74 is dimensioned such that it forms shoulders which engage the cap of a cap screw 75, such that each slip 71 is maintained in camming contact with compression bowl surface 15. Hence, upon application of an axial force against the blunt or butt end of each of the slips 71, the slips 71 are thereby urged axially and cammed radially inwardly into gripping engagment with pipe 12, as shown in FIG. 2.

The blunt or butt ends of each of the slips 71 has spaced adjacent thereto a metal compression ring 79 which may be somewhat deformable to accommodate variation in distance of travel of each of the slips 71 during setting thereof, and/or may be dimensioned for slight tilting to accommodate such variation in slip movement.

Ring 79 has mounted axially adjacent thereto spring means in the form of a rubber or other elastomeric compensator ring 80 which is arranged for storing energy when compressed axially, such that it not only transmits axial force but stores energy to maintain a constant bias pressure against compression ring 79. Compensator ring 80 has also mounted adjacent the other side thereof another metal compression ring 81 which is similar to ring 79. The other side of ring 81 is arranged for abutting against the ends of a plurality of longitudinally extending pistons 84, each of which is mounted in one of a plurality of axially extending cylinders 85 provided in circumferentially spaced about positions within housing 11. Upon movement of pistons 84 axially to the right, as shown in FIGS. 1 and 2, metal ring 81, compensator ring 80 and metal ring 79 are urged axially against slips 71, causing the same to be cammed to the previously described setting or gripping position with pipe 12. Because of the compressible nature of compensator ring 80, energy is stored therein during the aforesaid compression which maintains a constant bias force against the blunt ends of each of the slips 71, as shown in FIG. 2.

Tension bowl surface 21 also has mounted radially adjacent thereto another plurality of slips 86 which are identical with slips 71 previously described and each are held in camming engagement with tension bowl surface 21 by a cap screw 87, the same as slips 71 are held in position by cap screws 75. The butt ends of slips 86 have spaced axially adjacent thereto an assemblage comprising a metal ring 88, a rubber or elastomeric compensator ring 89 and another metal ring 90, the construction and operation of which are identical with the previously described rings 79, 80 and 81 and are arranged for applying axial force to slips 86 to thereby actuate the same to gripping engagement with pipe 12 as shown in FIG. 2.

Ring 90 is arranged for abuttment by another plurality of pistons 91, each of which is mounted in one of the cylinders 85 and co-axially aligned with one of the previously described pistons 84. Stated otherwise, each of eh cylinders 85 has two pistons 84 and 91 mounted therein and arranged for axial movement in opposite directions to thereby cause actuation of both pluralities or groups of slips 71 and 86 to the set position.

Housing 11 is provided with an annular conduit 94 which extends circumferentially therein and which communicates radially outwardly through port 95 to an injection plug 96 and radially inwardly through a plurality of ports 97, each of which communicates to one of the cylinders 85 at a point intermediate the adjacent ends of pistons 91 and 84. Housing 11 is also provided with another plug which is identical with plug 96 but spaced at 180° circumferentially therefrom which can be used as a bleeder plug to bleed any fluids from cylinders 85 should that be desirable.

Upon application of hydraulic fluid pressure through injector plug 96, port 95, conduit 94 and ports 97 to cylinders 85, the pistons 91 and 84 in each of the cylinders 85 are urged axially apart to effect setting of the slips as described above. Should it become desirable to evacuate the hydraulic fluid and substitute a settable epoxy resin, then the aforesaid bleeder plug can be opened and the hydraulic fluid flowed out while the exposy resin is flowed through injector plug 96 under the required pressure to keep the slips set. Upon setting of the epoxy resin in this instance, the slips are permanently held in the set position, thereby effecting a permanent connection with pipe 12.

By having compression bowl surface 15 and tension bowl surface 21 facing each other and by having slips 71 and 86 constructed and operated as described above, there is provided a coupling which will withstand both tension and compression forces which may be applied axially between housing 11 and pipe 12. In other words, when housing 11 and pipe 12 are submitted to axial compression forces, slips 71 by their contact with compression bowl surface 15 resist such force. When housing 11 and pipe 12 are subjected to axial tension forces, slips 86 by their cooperation with tension bowl surface 21, resist such force, with the result that the tool can withstand both tension and compression without failure or without dislodgement of the slips. Further, by having the spring means in the form of the compensator rings 80 and 89, the respective slips are always under a biasing force which constantly maintains each of the slips in a set position, further insuring the continued operation thereof without failure. It is to be understood that the size and hardness of compensator rings 80 and 89 may be varied depending upon the dimensions of the tool, the line pressure expected in the pipeline and the pressure exerted by the external environment, and these variations can be made without effecting sealing of housing 11 with pipe 12 which is provided by separate sealing means in the form of packing rings 25 previously described.

In operation of the coupling, housing 11 is mounted on pipe 12 generally in the unactuated position as shown in FIG. 1, with the removable setting clamp 55 mounted thereover as shown in FIG. 3. With pipe 12 inserted into housing 11 to the extent shown in FIG. 2, the coupling step can be completed then by applying hydraulic pressure to the proper ends of hydraulic cylinder piston assemblies 65, which in turn causes a compression force on sleeve 37, causing the same to move axially to the right as shown in FIG. 2, thereby axially compressing and radially deforming packing rings 25 to the sealing position shown in FIG. 2. Once such sealing has been effected, testing thereof can be accomplished as described above by the application of another presurized fluid through injector plug 30. In the event it is determined that the seal is not functioning for some reason, sleeve 37 may be removed in the manner previously described and new packing rings 25 substituted if required, with the necessity of removing housing 11 from pipe 12.

The gripping means are actuated by the application of fluid pressures such as hydraulic pressure through injector plug 96 which is described above causes each of the pistons 91 and 84 in each of the cylinders 85 to apply hydraulic actuated force to thereby set each of the plurality of slips 71 and 86 as described above. If a permanent connection is desired, then the hydraulic fluid can be removed through the previously described bleeder plug and epoxy resin introduced through injector plug 96.

It will thus be observed that this invention provides a coupling which has seal means and actuation means therefor which are separate from the gripping means and the actuation means therefor. The arrangement of the gripping means are such that the tool can resist tension and compression forces both, and partial failure of one system will not impair the effective operation of the other system. Moreover, the arrangement of the sealing system is such that it can be repaired should a malfunction develop without disturbing the gripping system.

While in the foregoing sequence, the seal means were described as being actuated first, it is to be understood that the gripping system could be actuated first and thereafter the sealing system actuated or for that matter, the two could be actuated simultaneously with each other. However, simultaneous actuation is not required since each has separate actuation means operable by separate pressurized fluids which may or may not be from the same source. Moreover, the invention provides a removable setting clamp which may be demounted from the coupling and used for actuating the seal means on other couplings, thereby saving an expense.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a pipe coupling apparatus, the combination comprising:
    a housing arranged for mounting about the external surface of a pipe to which connection is to be made;
    a pair of annular elastomeric seals mounted in said housing for effecting a seal between said housing and said pipe upon deformation thereof, said seals having mounted therebetween an annular test ring arranged to separate said seals and to transmit fluid pressure therebetween;
    said housing including conduit means for applying pressurized fluid to said testing ring after said seals are moved to the sealing position, for testing said seals;
    means for applying axial force to said seals to thereby deform said seals to said sealing position;
    means for retaining said deforming means in said seal deforming position;
    said housing having internally thereof an axially tapered annular circumferentially continuous compression bowl surface and an axially tapered annular circumferentially continuous tension bowl surface facing said compression bowl surface, said facing bowl surfaces together being axially spaced apart from said seal means;
    a plurality of circumferentially disposed wedge-shaped gripping slips supported in said housing in camming relationship with said tension and compression bowl surfaces respectively and arranged for gripping contact with said pipe when cammed axially along the adjacent bowl surface, whereby said pipe is capable of being held against axial movement relative to said housing independently of and in spaced relation to said seal means;
    and means for urging said slips to said gripping positions.

2. Apparatus as defined in claim 1 wherein:
    said means for applying axial force to said seal means and said means for urging said slips each includes hydraulic actuation means.

3. Apparatus as defined in claim 2 wherein:
    said hydraulic actuation means for applying axial force to said seal means includes a plurality of hydraulic piston and cylinder assemblies.

4. The invention as claimed in claim 3 wherein:
    said hydraulic cylinder and piston assemblies are detachably connected to said housing.

5. In a pipe coupling apparatus, the combination comprising:
    a housing arranged for mounting about the external surface of a pipe to which connection is to be made;

deformable annular seal means mounted in said housing for effecting a seal between said housing and said pipe upon deformation thereof;

means for applying axial force to said seal means to thereby deform said seal means to said sealing position, said means for applying axial force to said seal means including an annular member having one axial end arranged to abut against the end of said seal means;

means for retaining said deforming means in said seal deforming position, said means for retaining said deforming means in said seal deforming position including means carried by said annular member for engaging the internal surface of said housing upon actuation thereof to thereby lock said annular member in a fixed position in said housing after said seal means has been actuated to the sealing position;

said housing having internally thereof an axially tapered annular circumferentially continuous compression bowl surface and an axially tapered annular circumferentially continuous tension bowl surface facing said compression bowl surface, said facing bowl surfaces together being axially spaced apart from said seal means;

a plurality of circumferentially disposed wedge-shaped gripping slips supported in said housing in camming relationship with said tension and compression bowl surfaces respectively and arranged for gripping contact with said pipe when cammed axially along the adjacent bowl surface, whereby said pipe is capable of being held against axial movement relative to said housing independently of and in spaced relation to said seal means;

and means for urging said slips to said gripping positions.

6. In a pipe coupling apparatus, the combination comprising:

a housing arranged for mounting about the external surface of a pipe to which connection is to be made;

deformable annular seal means mounted in said housing for effecting a seal for withstanding pipeline pressure between said housing and said pipe upon deformation thereof;

means for axially deforming said seal means to said sealing position;

means for retaining said deforming means in said seal deforming position;

said housing having internally thereof an axially tapered annular circumferentially continuous compression bowl and an axially tapered annular circumferentially continuous tension bowl facing said compression bowl, said facing bowls together being axially spaced apart in the same axial direction away from said seal means;

annular gripping means supported in said housing in camming relationship with each of said bowls and capable of being set against said pipe upon axial camming movement thereof along the adjacent bowl, whereby said pipe is cabable of being held against axial movement relative to said housing independent of and in axially spaced relation to said seal means;

means for urging each said gripping means to said set position independently of said deforming means, and means for holding said urging means when the latter has set said gripping means.

7. Apparatus as defined in claim 6 wherein:

said means for urging said slips to said gripping position includes annular spring means to continuously urge said slips into said gripping position.

8. The invention as claimed in claim 7 wherein:

said spring means are in the form of elastomeric rings.

9. In a pipe coupling apparatus, the combination comprising:

a housing arranged for mounting about the external surface of a pipe to which connection is to be made;

deformable annular seal means mounted in said housing for effecting a primary seal to withstand line pressure between said housing and said pipe upon deformation thereof;

means for selectively deforming said seal means to said sealing position;

means for retaining said deforming means in said seal deforming position;

said housing having internally thereof an axially tapered annular circumferentially continuous compression bowl surface and an axially and oppositely tapered annular circumferentially continuous tension bowl surface facing said compression bowl surface, said facing bowl surfaces together being axially spaced apart from said seal means in the same axial direction;

a pair of axially spaced annular wedge-shaped gripping means supported in said housing in camming relationship with respective bowl surfaces and capable of being set against said pipe upon axial camming movement thereof along the respective bowl surfaces, whereby said pipe is capable of being held against axial movement relative to said housing independent of and in axially spaced relation to said seal means;

means for selectively urging said pair of annular gripping means axially apart to said set position independently of said deforming means, and means for holding said urging means when the latter has set said gripping means.

10. In a pipe coupling apparatus, the combination comprising:

a housing arranged for mounting about the external surface of a pipe to which connection is to be made;

deformable annular seal means mounted in said housing for effecting a seal to withstand line pressure between said housing and said pipe upon deformation thereof;

means for applying axial force to said seal means to thereby deform said seal means to said sealing position;

means for retaining said deforming means in said seal means deforming position;

said housing having internally thereof a pair of spaced apart tapered annular bowl surfaces facing each other, said bowl surfaces both being axially spaced apart from said seal means in the same axial direction;

gripping means supported in said housing in camming relationship with each of said bowl surfaces for gripping said pipe when cammed axially along the adjacent bowl surface;

and fluid actuated means for urging said gripping means to said gripping positions, independently from said means for applying axial force to said seal means.

11. In a pipe coupling apparatus, the combination comprising:
a housing arranged for mounting about the external surface of a pipe to which connection is to be made;
said housing having a first portion having means internally thereof forming a pair of spaced apart and axially tapered annular bowl surfaces facing each other;
gripping means supported in said housing in camming relationship with each of said bowl surfaces for gripping said pipe at two axially spaced apart positions when cammed axially along the adjacent bowl surfaces;
fluid actuated means for urging said gripping means to said gripping positions;
said housing having another portion axially spaced from said first portion, said other portion having an internal diameter sized to form an annular seal receiving space with said pipe to which connection is to be made;
deformable annular seal means mounted in said seal receiving space for effecting a seal between said other portion of said housing said pipe upon deformation thereof;
means independent of said fluid actuated urging means for applying axial force to said seal means to thereby deform said seal means to said sealing position;
and means for retaining said deforming means in said seal means deforming position.

* * * * *

UNITED STATES PATENT AND TRADEMARK OFFICE
CERTIFICATE OF CORRECTION

PATENT NO. : 3,986,728
DATED : October 19, 1976
INVENTOR(S) : Gerald A. Marsh

It is certified that error appears in the above-identified patent and that said Letters Patent are hereby corrected as shown below:

Column 4, line 11, "wuch" should be --such--.

Column 6, line 24, "eh" should be --the--.

Column 12, line 11, add --and-- after "portion of said housing".

Signed and Sealed this

Twenty-first Day of December 1976

[SEAL]

Attest:

RUTH C. MASON
Attesting Officer

C. MARSHALL DANN
Commissioner of Patents and Trademarks